(12) United States Patent
Chopra et al.

(10) Patent No.: US 11,675,931 B2
(45) Date of Patent: *Jun. 13, 2023

(54) CREATING VENDOR-NEUTRAL DATA PROTECTION OPERATIONS FOR VENDORS' APPLICATION RESOURCES

(71) Applicant: EMC IP Holding Company LLC, Hopkinton, MA (US)

(72) Inventors: Shelesh Chopra, Bangalore (IN); Pawan Singh, Bangalore (IN); Jayashree Radha, Bangalore (IN); Yasemin Ugur-Ozekinci, Oakville (CA); Ken Owens, Bulington (CA); Adrian Dobrean, Hopkinton, MA (US); Navneet Upadhyay, Bangalore (IN); Krishnendu Bagchi, Bangalore (IN); Sunil Yadav, Bangalore (IN); Matt Buchman, Hopkinton, MA (US); Asif Khan, Bagalore (IN); Amith Ramachandran, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 303 days.

This patent is subject to a terminal disclaimer.

(21) Appl. No.: 16/830,988

(22) Filed: Mar. 26, 2020

(65) Prior Publication Data
US 2021/0334396 A1 Oct. 28, 2021

(51) Int. Cl.
G06F 21/62 (2013.01)
G06F 21/64 (2013.01)
G06F 11/14 (2006.01)

(52) U.S. Cl.
CPC ........ *G06F 21/629* (2013.01); *G06F 11/1464* (2013.01); *G06F 21/6227* (2013.01); *G06F 21/64* (2013.01)

(58) Field of Classification Search
CPC ..... G06F 21/629; G06F 21/6227; G06F 21/64
See application file for complete search history.

(56) References Cited

U.S. PATENT DOCUMENTS

| | | | |
|---|---|---|---|
| 2017/0339002 A1* | 11/2017 | Sigoure | |
| 2018/0253361 A1* | 2/2018 | Dhatrak | G06F 11/3034 |
| 2019/0108266 A1* | 4/2019 | Manvar | G06F 11/1464 |
| 2019/0303712 A1* | 10/2019 | Suprono | G06K 9/3208 |

* cited by examiner

*Primary Examiner* — Mohammad A Siddiqi
(74) *Attorney, Agent, or Firm* — Dergosits & Noah LLP; Todd A. Noah

(57) ABSTRACT

Creating vendor-neutral data protection operations for vendors' application resources is described. Capabilities specified for data protection operations by a vendor of an application are input from a host of the application. Any capabilities specified for the data protection operations are used to create a vendor-neutral version of a data protection operation for a resource of the application. The vendor-neutral version of the data protection operation for the application resource is output to the host. A result of performing the vendor-neutral version of the data protection operation on the application resource is input from the host.

20 Claims, 5 Drawing Sheets

CREATING VENDOR-NEUTRAL DATA PROTECTION OPERATIONS FOR VENDORS' APPLICATION RESOURCES

BACKGROUND

A data object can be a set of information that is backed up as a unit. If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of data and these values' embedding in a database's data structures) within dedicated backup files. When the data protection administrator decides to return the data object to a previous state, the data protection administrator specifies the desired previous state by identifying a desired time when the data object was in this state, and then instructs the backup/restore application to execute a restore operation to restore a copy of the corresponding backup file(s) for that state to the data object.

Data protection operation can include a discover database operation, a discover copy metadata operation, a backup operation, a restore operation, a schedule operation, and an install update operation. A discover database operation can be an action to identify structured information stored in a computer. A discover copy metadata operation can be an action to identify information about a backup of structured information stored in a computer. A backup operation can be an action to create a copy of structured information stored in a computer. A restore operation can be an action to reconstruct structured information stored in a computer. A schedule operation can be an action to arrange for an entity to do something. An install update operation can be an action to insert a recent version in a position for use.

A backup/restore application can create a full backup file for a data object by backing up all of the data in the data object. A full backup file may be created at infrequent intervals and can serve as a reference point for subsequent differential backup files, incremental backup files, and/or transaction log backup files. A backup/restore application can create a differential backup file for a data object by backing up the data that has changed in the data object since the last full backup file was created for the data object. As the elapsed time increases since the most recent full backup file, the accumulated changes increase in a data object, as does the time to create a differential backup file. A backup/restore application can create an incremental backup file for a data object by backing up only data that is new or changed in the data object since the most recent previous backup file was created, which may have been a full backup file, a differential backup file, or another incremental backup file. Since an incremental backup file does not store duplicate copies of unchanged data, a system can efficiently store more backup files created at more points in time by organizing the data into increments of change between points in time. A backup/restore application can create a transaction log backup file for a data object by only backing up a history of actions executed by the data object's management system. The data object's management system can use a transaction log backup file to re-apply the changes made by committed transitions that are not materialized in a data object and roll back the changes to a data object that were made by uncommitted transactions.

A data object may be stored on a storage array, which can be a disk-based retention system that includes multiple disk drives. Unlike a disk enclosure, a storage array has cache memory and advanced functionality, such as virtualization and Redundant Array of Independent Disks (RAID). A data protection administrator can instruct a backup/restore application to create backups files of data objects and store the backup files of data objects on multiple storage arrays.

A backup/restore application can include an application data manager that uses an application programming interface (API) to communicate with application data management agents on an application host to access applications' resources that are stored on the host. An application data manager can be a computer system that organizes information from a computer program. An agent or an application data management agent can be a computer program designed to automate certain tasks for or in the place of another computer program. A host or an application host can be a computer that executes a computer program that performs a particular task or set of tasks. A resource can be an application server, a database, copy metadata, an application, or a file system. An application server can be a computer that executes a computer program that performs a particular task or set of tasks. A database can be structured information stored in a computer. Copy metadata can be information about a backup of structured information stored in a computer. An application can be a computer program that performs a particular task or set of tasks. A file system can be an apparatus that organizes collections of computer data and programs.

DETAILED DESCRIPTION

Figure 1:
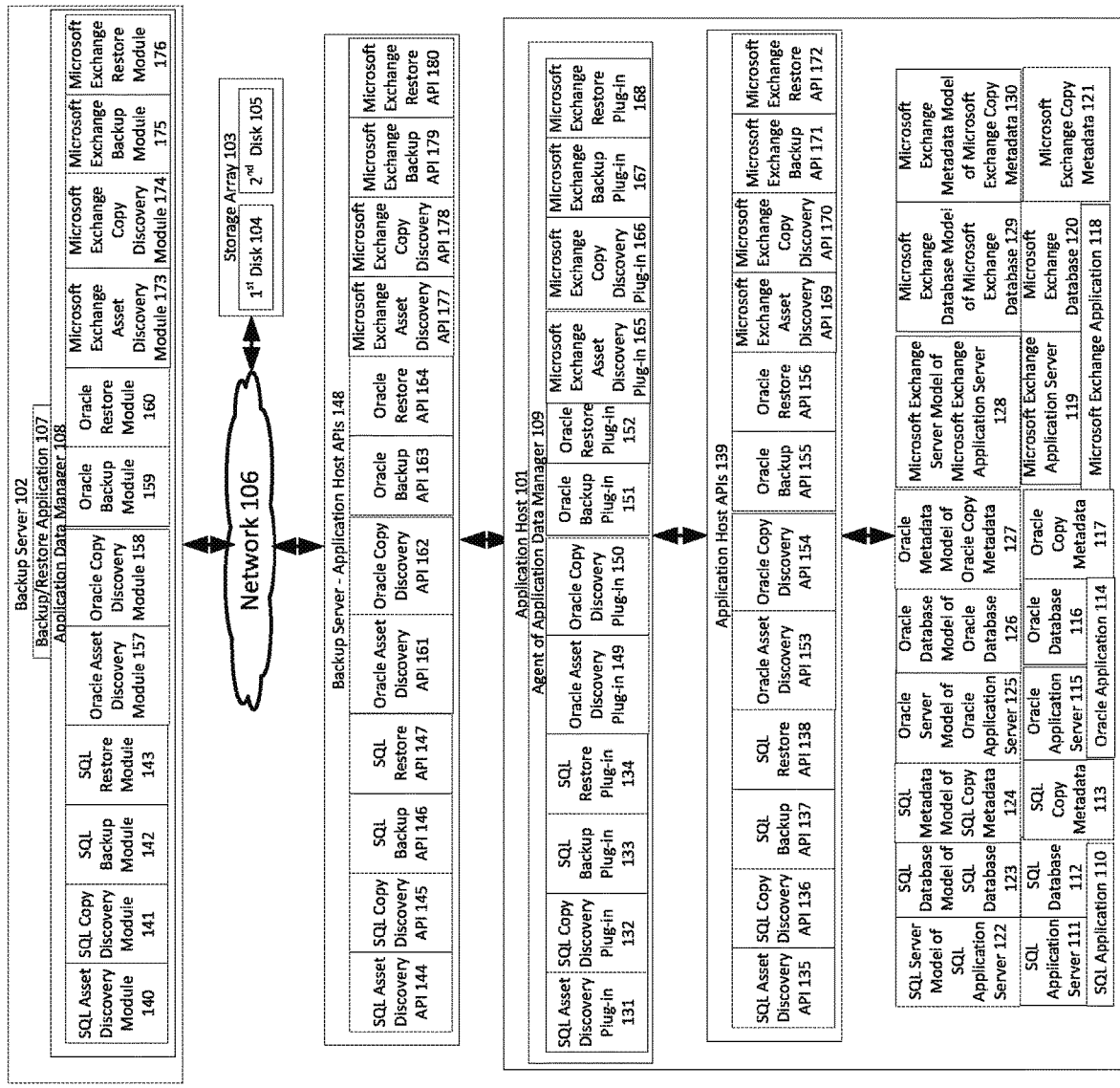
FIG. 1 illustrates a block diagram of an example prior art system for backing up and restoring vendor application resources.

FIG. 1 depicts a prior art data protection system 100, which requires significant changes in both an application host 101 and a backup server 102 to protect an application's data objects when the application is installed on the application host 101. An example is described in detail below in reference to FIG. 1, in which the new installation of a Microsoft® Exchange application 118 on the application host 101 results in the creation of Microsoft® Exchange models of the Microsoft® Exchange application server, database, and copy metadata 128-130 on the application host 101. However, the new installation of the Microsoft® Exchange application 118 also results in the creation of plug-ins for Microsoft® Exchange asset discovery, copy discovery, backup, and restore 165-168 on the application host 101, despite the plug-ins for SQL asset discovery, copy discovery, backup, and restore 131-134 and the plug-ins for Oracle® asset discovery, copy discovery, backup, and restore 149-152 that were already on the application host 101. Similarly, the new installation of the Microsoft® Exchange application 118 also results in the creation of APIs for Microsoft® Exchange asset discovery, copy discovery, backup, and restore 169-172 on the application host 101, despite the APIs for SQL asset discovery, copy discovery, backup, and restore 135-138 and the APIs for Oracle® asset discovery, copy discovery, backup, and restore 153-156 that were already on the application host 101. Likewise, the new installation of the Microsoft® Exchange application 118 also results in the creation of modules for Microsoft® Exchange asset discovery, copy discovery, backup, and restore 173-176 on the backup server 102, despite the modules for SQL asset discovery, copy discovery, backup, and restore 140-143 and the modules for Oracle® asset discovery, copy discovery, backup, and restore 157-160 that were already on the backup server 102.

Additionally, the new installation of the Microsoft® Exchange application 118 also results in the creation of APIs for Microsoft® Exchange asset discovery, copy discovery, backup, and restore 177-180 that are accessible by the backup server 102, despite the APIs for SQL asset discovery, copy discovery, backup, and restore 144-147 and the APIs for Oracle® asset discovery, copy discovery, backup, and restore 161-164 that were already accessible by the backup server 102. The addition of so many vendor-specific components in response to the new installation of each vendor's application significantly delays the on-boarding of each vendor's application, and also significantly increases the memory and processor utilization in the application host 101 and the backup server 102.

Embodiments herein provide creating vendor-neutral data protection operations for vendors' application resources. A backup server inputs capabilities specified for data protection operations by a vendor of an application from a host of the application. The backup server uses any capabilities specified for the data protection operations to create a vendor-neutral version of a data protection operation for a resource of the application. The backup server outputs the vendor-neutral version of the data protection operation for the application resource to the host. The backup server inputs a result of performing the vendor-neutral version of the data protection operation on the application resource from the host.

An example is described in detail below in reference to FIG. 2, in which a backup server 202 inputs data protection operation capabilities, which include centralized backup, specified by the Microsoft® Exchange application 218 from the application host 201. The backup server 202 uses the centralized backup capability to create a vendor-neutral backup operation for the Microsoft® Exchange copy metadata 221, and outputs the vendor-neutral backup operation for the Microsoft® Exchange copy metadata 221 to the application host 201. The backup server 202 inputs a backup copy of the Microsoft® Exchange copy metadata 221 from the application host 201. As described in detail below in reference to FIG. 2, the application host 201 requires the addition of only a relatively small number of system components and the backup server 202 does not require the addition of any system components in response to a new installation of an application. Therefore, the system 200 expedites application onboarding and conserves the memory and processor utilization in the application host 201 and the backup server 202.

FIG. 1 illustrates a diagram of an example prior art system 100 for backing up and restoring vendors' application resources, which includes an application host 101, a backup server 102, and a storage array 103 (that includes a first disk 104 and a second disk 105), which communicate via a network 106. Although FIG. 1 depicts the system 100 with one application host 101, the system 100 may include any number of application hosts 101. The backup server 102 includes a backup/restore application 107, which can create backup files of data objects for the application host 101 and can execute a restore based on the backup files stored on the storage array 103, and an application data manager 108, which the backup/restore application 107 can use to backup data objects and restore data objects. The application data manager 108 may use an API to communicate with an agent of the application data manager 109 on the application host 101 to access vendors' application resources stored on the application host 101.

For an example of a vendor's application resources, the application host 101 installs a SQL application 110, stores the installation configuration as a SQL application server 111, stores data for the SQL application 110 in a SQL database 112, and stores backup data for the SQL application 110 as SQL copy metadata 113. In another example of a vendor's application resources, the application host 101 installs an Oracle® application 114, stores the installation configuration as an Oracle® application server 115, stores data for the Oracle® application 114 in an Oracle® database 116, and stores backup data for the Oracle® application 114 as Oracle® copy metadata 117. In yet another example of a vendor's application resources, the application host 101 installs a Microsoft® Exchange application 118, stores the installation configuration as a Microsoft® Exchange application server 119, stores data for the Microsoft® Exchange application 118 in a Microsoft® Exchange database 120, and stores backup data for the Microsoft® Exchange application 118 as Microsoft® Exchange copy metadata 121.

Each vendor's application resources are inherently different from other vendors' corresponding application resources. For example, the data in the SQL database 112 is organized differently from the organization of data in the Oracle® database 116, and the metadata in the SQL copy metadata 113 is organized differently from the organization of metadata in the Oracle® copy metadata 117. The application host 101 installs vendor-specific application resource models to access a vendor's application resources, which differ from other vendors' corresponding application resources, and a vendor's application resource models are arbitrarily different from other vendors' application resource models. For example, the application host 101 installs a SQL server model of the SQL application server 114 to access the SQL application server 111, installs a SQL database model of the SQL database 123 to access the SQL database 112, and installs a SQL metadata model of the SQL copy metadata 124 to access the SQL copy metadata 113. In another example, the application host 101 installs an Oracle® server model of the Oracle® application server 125 to access the Oracle® application server 115, installs an Oracle® database model of the Oracle® database 126 to access the Oracle® database 116, and installs an Oracle® metadata model of the Oracle® copy metadata 127 to access the Oracle® copy metadata 117. In yet another example, the application host 101 installs a Microsoft® Exchange server model of the Microsoft® Exchange application server 128 to access the Microsoft® Exchange application server 119, installs a Microsoft® Exchange database model of the Microsoft® Exchange database 129 to access the Microsoft® Exchange database 120, and installs a Microsoft® Exchange metadata model of Microsoft® Exchange copy metadata 130 to access the Microsoft® Exchange copy metadata 121. The vendors' application resource models 111-113, 115-117, and 119-121 may be provided by the vendors and/or derived by the application host 101.

FIG. 1 depicts one application host 101 that executes three vendors' applications 110, 114, and 118, and installs nine vendor-specific application resource models 122-130 to access nine application resources 111-113, 115-117, and 119-121, for the three vendors' applications 110, 114, and 118. However, any number of application hosts 101 can execute any number of vendors' applications 110, 114, and 118, and install any number of vendor-specific application resource models 122-130 to access any number of application resources 111-113, 115-117, and 119-121, for any number of vendors' applications 110, 114, and 118, After the application host 101 installs a vendor's application resource models that are different for each vendor, the agent of application data manager 109 installs plug-ins that are different for each vendor and which enable data protection operations for the vendor's application resources via the vendor-specific application resource models. Since the vendor-specific plug-ins need to communicate with the vendor-specific application resource models, the application host 101 adds APIs that are different for each vendor and which enable the vendor-specific plug-ins to enable data protection operations for the vendor's application resources via the vendor-specific application resource models. Since the application data manager 108 also needs to enable data protection operations for a vendor's application resources, the application host 101 publishes the attributes of the vendor's plug-ins, APIs, application resources models, application resources, and/or application to the application data manager 108. Then the application data manager 108 installs modules that are different for each vendor, which are based on the published attributes, and which enable data protection operations for the vendor's application resources via the vendor-specific plug-ins, APIs, and application resource models. Since the vendor-specific modules need to communicate with a vendor's plug-ins, the application data manager 108 adds APIs that are different for each vendor and which enable the vendor-specific modules to enable data protection operations for the vendor's application resources via the vendor-specific plug-ins, APIs, and application resource models In an example of adding SQL components, after the application host 101 installs the SQL application resource models 122-124, the agent of application data manager 109 installs a SQL asset discovery plug-in 131, a SQL copy discovery plug-in 132, a SQL backup plug-in 133, and a SQL restore plug-in 134. Then the application host 101 adds a SQL asset discovery API 135, a SQL copy discovery API 136, a SQL backup API 137, and a SQL restore API 138 to the application host APIs 139, which enable the SQL plug-ins 131-134 to access the SQL resources 111-113 via the SQL application resource models 122-124. Next, the agent of application data manager 109 publishes the attributes of the SQL plug-ins 131-134, APIs 135-138, application resources models 122-124, application resources 111-113, and/or application 110 to the application data manager 108. The published attributes enable the application data manager 108 to install a SQL asset discovery module 140, a SQL copy discovery module 141, a SQL backup module 142, and a SQL restore module 143. Then the application data manager 108 adds a SQL asset discovery API 144, a SQL copy discovery API 145, a SQL backup API 146, and a SQL restore API 147 to the backup server-application host APIs 148, which enable the SQL modules 140-143 to access the SQL application resources 111-113 via the SQL plug-ins 131-134, the SQL APIs 135-138, and the SQL application resource models 122-124. In an example of the sequence of executions to implement a SQL backup operation, the application data manager 108 executes the SQL backup module 142, which executes the SQL backup API 146, which executes the SQL backup plug-in 133 in the agent of application data manager 109, which executes the SQL backup API 137 to back up the SQL copy metadata 113 via the SQL model for SQL copy metadata 124.

In an example of adding Oracle® components, after the application host 101 installs the Oracle® application resource models 115-117, the agent of application data manager 109 installs an Oracle® asset discovery plug-in 149, an Oracle® copy discovery plug-in 150, an Oracle® backup plug-in 151, and an Oracle® restore plug-in 152. Then the client/application host 101 adds an Oracle® asset discovery API 153, an Oracle® copy discovery API 154, an Oracle® backup API 155, and an Oracle® restore API 156 to the application host APIs 139, which enable the Oracle® plug-ins 149-152 to access the Oracle® resources 115-117 via the Oracle® models 125-123. Next, the agent of application data manager 109 publishes the attributes of the Oracle® plug-ins 149-152, APIs 153-156, application resources models 125-127, application resources 115-117, and/or application 114 to the application data manager 108. The published attributes enable the application data manager 108 to install an Oracle® asset discovery module 157, an Oracle® copy discovery module 158, an Oracle® backup module 159, and an Oracle® restore module 160. Then the application data manager 108 adds an Oracle® asset discovery API 161, an Oracle® copy discovery API 162, an Oracle® backup API 163, and an Oracle® restore API 164 to the backup server-application host APIs 148, which enable the Oracle® modules 157-160 to access the Oracle® application resources 115-117 via the Oracle® plug-ins 149-152, the Oracle® APIs 153-156, and the Oracle® application resource models 125-127. In an example of the sequence of executions to implement an Oracle® backup operation, the application data manager 108 executes the Oracle® backup module 159, which executes the Oracle® backup API 163, which executes the Oracle® backup plug-in 151 in the agent of application data manager 109, which executes the Oracle® backup API 155 to back up the Oracle® copy metadata 117 via the Oracle® model for Oracle® copy metadata 123.

In an example of adding Microsoft® Exchange components, after the application host 101 installs the Microsoft® Exchange application resource models 128-130, the agent of application data manager 109 installs a Microsoft® Exchange asset discovery plug-in 165, a Microsoft® Exchange copy discovery plug-in 166, a Microsoft® Exchange backup plug-in 167, and a Microsoft® Exchange restore plug-in 168. Then the application host 101 adds a Microsoft® Exchange asset discovery API 169, a Microsoft® Exchange copy discovery API 170, a Microsoft® Exchange backup API 171, and a Microsoft® Exchange restore API 172 to the application host APIs 139, which enable the Microsoft® Exchange plug-ins 165-168 to access the Microsoft® Exchange resources 119-121 via the Microsoft® Exchange application resource models 128-130. Next, the agent of application data manager 109 publishes the attributes of the Microsoft® Exchange plug-ins 165-168, APIs 169-172, application resources models 128-130, application resources 119-121, and/or application 118 to the application data manager 108.

The published attributes enable the application data manager 108 to install a Microsoft® Exchange asset discovery module 173, a Microsoft® Exchange copy discovery module 174, a Microsoft® Exchange backup module 175, and a Microsoft® Exchange restore module 176. Then the application data manager 108 adds a Microsoft® Exchange asset discovery API 177, a Microsoft® Exchange copy discovery API 178, a Microsoft® Exchange backup API 179, and a Microsoft® Exchange restore API 180 to the backup server-application host APIs 148, which enable the Microsoft® Exchange modules 173-176 to access the Microsoft® Exchange application resources 119-121 via the Microsoft® Exchange plug-ins 165-168, the Microsoft® Exchange APIs 169-172, and the Microsoft® Exchange application resource models 128-130. In an example of the sequence of executions to implement a Microsoft® Exchange backup operation, the application data manager 108 executes the Microsoft® Exchange backup module 175, which executes the Microsoft® Exchange backup API 179, which executes the Microsoft® Exchange backup plug-in 167 in the agent of application data manager 109, which executes the Microsoft® Exchange backup API 171 to back up the Microsoft® Exchange copy metadata 121 via the Microsoft® Exchange model for Microsoft® Exchange copy metadata 130.

FIG. 1 depicts the system 100 with one application data manager 102 that executes twelve modules 140-143, 157-160, and 173-176, which execute twelve APIs 144-147, 161-164, and 177-180, which execute twelve plug-ins 131-134, 149-152, and 165-168 in one agent of application data manager 109, which executes twelve APIs 135-138, 153-156, and 169-172 to access up nine application resources 111-113, 115-117, and 119-121 via nine application resource models 122-130. However, the system 100 may include any number of application data managers 102 that execute any number of modules 140-143, 157-160, and 173-176, which execute any number of APIs 144-147, 161-164, and 177-180, which execute any number of plug-ins 131-134, 149-152, and 165-168 in any number of agents of application data managers 109, which execute any number of APIs 135-138, 153-156, and 169-172 to access any number of application resources 111-113, 115-117, and 119-121 via any number of application resource models 122-130. The addition of so many vendor-specific components in response to the new installation of each vendor's application significantly delays the on-boarding of each vendor's application, and also significantly increases the memory and processor utilization in the application host 101 and the backup server 102.

Figure 2:
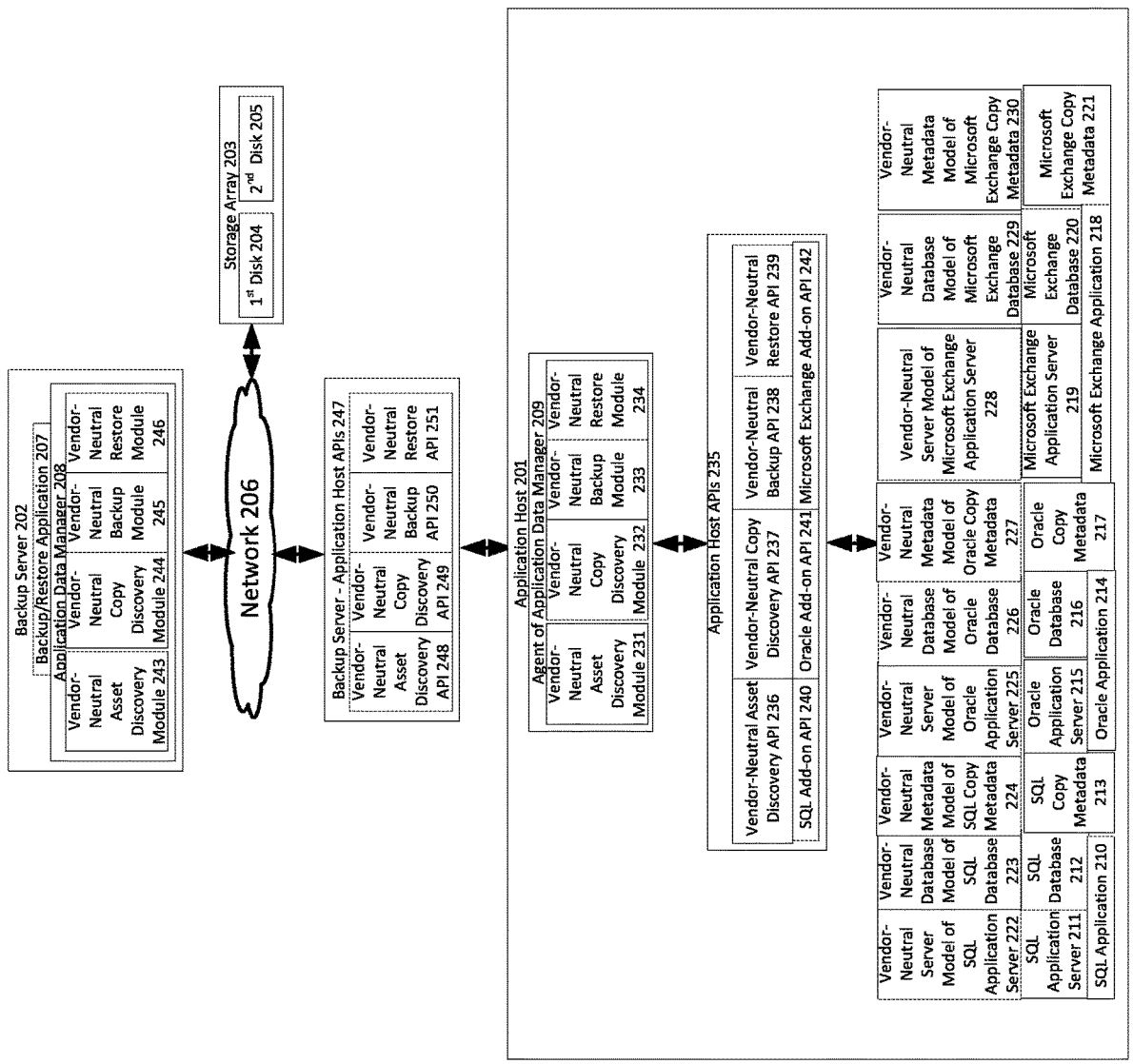
FIG. 2 illustrates a block diagram of an example system for vendor-neutral models of vendors' application resources and creating vendor-neutral data protection operations for vendors' application resources, under an embodiment.

In contrast, FIG. 2 illustrates a diagram of a system 200 for vendor-neutral models of vendors' application resources and creating vendor-neutral versions of data protection operations for vendors' application resources, under an embodiment. A vendor can be a producer, broker, dealer, merchandiser, or seller of a product or service. A vendor-neutral model can be a representation that is compatible with multiple products. A vendor-neutral version can be an action that is compatible with multiple products.

As shown in FIG. 2, the system 200 may illustrate a cloud computing environment in which data, applications, services, and other resources are stored and delivered through shared data centers and appear as a single point of access for the users. The system 200 may also represent any other type of distributed computer network environment in which servers control the storage and distribution of resources and services for different client users.

In an embodiment, the system 200 represents a cloud computing system that includes a client 201, which may be referred to as an application host 201 and may be any type of computer, and a server 202, which may be referred to as a backup server 202, and a storage array 203, which includes a first disk 204 and a second disk 205, that may be provided by a hosting company. The application host 201, the backup server 202, and the storage array 203 communicate via a network 206. Although FIG. 2 depicts the system 200 with one application host 201, one backup server 202, one storage array 203, two disks 204-205, and one network 206, the system 200 may include any number of application hosts 201, any number of backup servers 202, any number of storage arrays 203, any number of disks 204-205, and any number of networks 206. The application host 201 and the backup server 202 may each be substantially similar to the system 500 depicted in FIG. 5 and described below.

The backup server 202 includes a backup/restore application 207 that can create backup files of data objects for the application host 201 and can execute a restore based on the backup files stored on the storage array 203. The backup/restore application 207 can provide centralized administration, such as scheduling, monitoring, and managing backup operations and backup files. The backup/restore application 207 can enable the storing of backup operation schedules, client policies, and client configurations. The backup/restore application 207 can provide a unique interface to the application host 201 during login, and also assist the backup server 202 in authenticating and registering the application host 201. The backup/restore application 207 can send backup/restore work orders to the application host 201, which can receive and process the work orders to start a backup or restore operation. The backup/restore application 207 can maintain a local database of all processes that execute on the backup server 202. The backup/restore application 207 can execute server-side processes for a system administrator's graphical management console, which may enable the system administrator to use command line interface tools for queries. For example, a system administrator identifies the application host 201 registered with the backup server 202.

The backup server 202 also includes an application data manager 208, which the backup/restore application 207 can use to backup data objects and restore data objects. FIG. 2 depicts the backup/restore application 207 and the application data manager 208 residing completely on the backup server 202, but the backup/restore application 207 and/or the application data manager 208 may reside in any combination of partially on the backup server 202, partially on another server which is not depicted in FIG. 2, and partially on the application host 201, such as residing as an agent of the application data manager 209 on the application host 201.

Although the following paragraphs describe DELL Corporation's PowerProtect® backup/restore application, DELL Corporation's NetWorker® backup/restore application, and DELL Corporation's Avamar® backup/restore application as examples of the backup/restore application 207, the backup/restore application 207 may be any other type of backup/restore application which provides the backup/restore functionalities described in the Background section. The backup server 202 may be any other type of backup server which provides the backup/restore functionalities described in the Background section.

The backup/restore application 207 may be a DELL Corporation's PowerProtect® Data Manager backup/restore application, which supports Microsoft® SQL/Microsoft® Exchange/DB2/Oracle®/SAP Oracle®/SAP HANA/Filesystem/Hadoop and Protect Point solutions, as well as Kubernetes containers and virtual environments. Providing more than just access to backups and restore capabilities, PowerProtect® Data Manager provides analytics and reuse for development/testing, leverages the cloud to extend data center capabilities, and protects cloud native applications. PowerProtect® Data Manager's automated orchestration of fail-over, failback, and testing simplifies production disaster recovery scenarios. PowerProtect® Data Manager empowers data and application owners to perform self-service backup and restore operations from native applications directly to Dell® protection storage appliances. When superior performance is crucial, PowerProtect® Data Manager provides a direct path between Dell® tier 1 storage and PowerProtect® Data Domain and/or Data Domain. PowerProtect® Data Manager extends protection to the cloud by tiering backups to cloud storage for long-term retention, thereby maximizing retention and access to backups without impacting on-premises protection storage resources. When tiering is not enough, PowerProtect® Data Manager enables disaster recovery to the public cloud. At the same time, PowerProtect® Data Manager's governance control provides Information Technology with the necessary oversight and governance to ensure compliance, making even the strictest service level objectives obtainable.

The backup/restore application 207 may be a DELL Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft® Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups. The core NetWorker® software backs up client file systems and operating system environments. Add-on database and application modules provide backup services for products such as Microsoft® Exchange Server. Client backup data may be sent to a remote NetWorker® storage node or stored on a locally attached device by the use of a dedicated storage node. DELL Corporation's NetWorker® modules for Microsoft® applications supports Microsoft® products such as Microsoft® Exchange, Microsoft® Sharepoint, Microsoft® SQL Server, and Microsoft® Hyper-V servers.

The backup/restore application 207 may be DELL Corporation's Avamar® backup/restore application, which provides fast, efficient backup and recovery through a complete software and hardware solution. Equipped with integrated variable-length deduplication technology, DELL Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for an immediate single step restore. The transmission of deduplicated backup sends only changed blocks, reducing network traffic. DELL Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. DELL Corporation's Avamar® data store features redundant power and networking, redundant array of independent disks, and redundant array of inexpensive nodes technology to provide uninterrupted data accessibility. Periodic checks of data systems ensure recoverability whenever needed. DELL Corporation's Avamar® systems may be deployed in an integrated solution with DELL Corporation's Data Domain® systems for high-speed backup and recovery of specific data types.

For an example of SQL application resources, the application host 201 installs a SQL application 210, stores the installation configuration as a SQL application server 211, stores data for the SQL application 210 in a SQL database 212, and stores backup data for the SQL application 210 as SQL copy metadata 213. In an example of Oracle® application resources, the application host 201 installs an Oracle® application 214, stores the installation configuration as an Oracle® application server 215, stores data for the Oracle® application 214 in an Oracle® database 216, and stores backup data for the Oracle® application 214 as Oracle® copy metadata 217. In an example of Microsoft® Exchange application resources, the application host 201 installs a Microsoft® Exchange application 218, stores the installation configuration as a Microsoft® Exchange application server 219, stores data for the Microsoft® Exchange application 218 in a Microsoft® Exchange database 220, and stores backup data for the Microsoft® Exchange application 218 as Microsoft® Exchange copy metadata 221. Consequently, the elements 201-221 in the system 200 are substantially similar to the elements 101-121 in the system 100.

As described above, the application host 101 installs each vendor's vendor-specific models to access each vendor's resources, such as installing SQL models 122-124 to access the SQL resources 111-113, installing Oracle® models 125-127 to access the Oracle® resources 115-117, and installing Microsoft® Exchange models 128-130 to access the Microsoft® Exchange resources 119-121. In contrast, the application host 201 generates vendor-neutral application resource models based on each vendor's application resources and installs the vendor-neutral application resource models to enable access to each vendor's application resources.

For a SQL example, the application host 201 generates a vendor-neutral server model of the SQL application server 222 based on the SQL application server 211 and installs the vendor-neutral server model of the SQL application server 222. A vendor-neutral model of an application server may include an identifier, a name, a version, an application type, a cluster type, cluster attributes, cluster nodes, a host identifier for the application server, and application server attributes for the backup/restore application 207. Continuing the SQL example, the application host 201 generates a vendor-neutral database model of the SQL database 223 based on the SQL database 212 and installs the vendor-neutral database model of the SQL database 223. A vendor-neutral model of a database may include an identifier, an application type, a database name, a database system identifier, a category, a container, a size, application tags, and an application server identifier for the database, and database attributes for the backup/restore application 207. Completing the SQL example, the application host 201 generates a vendor-neutral metadata model of the SQL copy metadata 224 based on the SQL copy metadata 213 and installs the vendor-neutral metadata model of the SQL copy metadata 224. A vendor-neutral model of copy metadata may include an identifier, an application type, a backup level, a backup start time, a name, an asset identifier, a top copy set identifier, a first sequence, and a last sequence for the copy metadata, and copy metadata attributes for the backup/restore application 207.

In an Oracle® example, the application host 201 generates a vendor-neutral server model of the Oracle® application server 225 based on the Oracle® application server 215 and installs the vendor-neutral server model of the Oracle® application server 225. Continuing the Oracle® example, the application host 201 generates a vendor-neutral database model of the Oracle® database 226 based on the Oracle® database 216 and installs the vendor-neutral database model of the Oracle® database 226. Completing the Oracle® example, the application host 201 generates a vendor-neutral metadata model of the Oracle® copy metadata 227 based on the Oracle® copy metadata 217 and installs the vendor-neutral metadata model of the Oracle® copy metadata 227. In a Microsoft® Exchange example, the application host 201 generates a vendor-neutral server model of the Microsoft® Exchange application server 228 based on the Microsoft® Exchange application server 219 and installs the vendor-neutral server model of the Microsoft® Exchange application server 228. Continuing the Microsoft® Exchange example, the application host 201 generates a vendor-neutral database model of the Microsoft® Exchange database 229 based on the Microsoft® Exchange database 220 and installs the vendor-neutral database model of the Microsoft® Exchange database 229. Completing the Microsoft® Exchange example, the application host 201, and generates a vendor-neutral metadata model of the Microsoft® Exchange copy metadata 230 based on the Microsoft® Exchange copy metadata 221 and installs the vendor-neutral metadata model of the Microsoft® Exchange copy metadata 230.

FIG. 2 depicts one application host 201 that executes three vendors' applications 210, 214, and 218, and installs nine vendor-neutral application resource models 222-230, to access nine application resources 211-213, 215-217, and 219-221, for the three vendors' applications 210, 214, and 218. However, any number of application hosts 201 can execute any number of vendors' applications 210, 214, and 218, and install any number of vendor-neutral application resource models 222-230, to access any number of application resources 211-213, 215-217, and 219-221, for any number of vendors' applications 210, 214, and 218, As described above, the application host 101 follows the installation of a vendor's application resource models by installing vendor-specific plug-ins to enable data protection operations for the vendor's application resources via the vendor's application resource models. For example, the application host 101 installs SQL plug-ins 131-134 that execute data protection operations for the SQL application resources 111-113 via the SQL application resource models 122-124, installs Oracle® plug-ins 149-152 that execute data protection operations for the Oracle® application resources 115-117 via the Oracle® application resource models 125-127. Continuing the example, the application host 101 installs Microsoft® Exchange plug-ins 165-168 that execute data protection operations for the Microsoft® Exchange application resources 119-121 via the Microsoft® Exchange application resource models 128-130.

In contrast, since the already existing vendor-neutral modules to execute data protection operations are already compatible with each vendor's application resources via the vendor-neutral application resource models. the application host 201 executes the already existing vendor-neutral modules to execute data protection operations for each vendor's application resources via the vendor-neutral application resource models. For example, the application host 201 executes a vendor-neutral asset discovery module 231 to discover the SQL database 212, the Oracle® database 216, and the Microsoft® Exchange database 220, and executes a vendor-neutral copy discovery module 232 to discover the SQL copy metadata 213, the Oracle® copy metadata 217, and the Microsoft® Exchange copy metadata 221. In another example, the application host 201 executes a vendor-neutral backup module 233 to back up the SQL copy metadata 213, the Oracle® copy metadata 217, and the Microsoft® Exchange copy metadata 221, and executes a vendor-neutral restore module 234 to restore the SQL database 212, the Oracle® database 216, and the Microsoft® Exchange database 220.

Consequently, the application host 201 executes a total of only four vendor-neutral modules 231-234 for the asset discovery, copy discovery, backup, and restore of nine vendor application resources 211-213, 215-217, and 219-221, whereas the application host 101 executes a total of twelve vendor-specific plug-ins 131-134, 149-152, and 165-168 for the asset discovery, copy discovery, backup, and restore of nine vendor application resources 111-113, 115-117, and 119-121. The numerical difference of eight executed components in this example is based on the application host 201 executing only four vendor-neutral modules 231-234 and the application host 101 executing a total of twelve vendor-specific plug-ins 131-134, 149-152, and 165-168 for the four asset discovery, copy discovery, backup, and restore operations to access nine vendor application resources for three vendors' applications. However, the number of data protection operations may be expanded to six data protection operations that also include a schedule operation and an install update operation, and the number of vendors' applications is expanded to six vendors' applications that also include SAP® HANA, Microsoft® Office 365, and IBM® Db2. Then the application host 201 would execute only six vendor-neutral modules while the application host 101 would execute a total of thirty-six vendor-specific plug-ins (six data protection operation plug-ins for each of the six applications), resulting in the numerical difference of thirty executed components. In real-world production environments, the numerical difference of executed components could be significantly greater.

As described above, the application host 101 follows the installation of vendor-specific plug-ins that execute data protection operations for a vendor by adding APIs that are different for every vendor to the application host APIs 139 to enable the vendor-specific plug-ins to access the vendor's application resources via the vendor-specific application resource models. For example, the application host 101 adds and executes the SQL APIs 135-138 to enable the SQL plug-ins 131-134 to execute data protection operations for the SQL application resources 111-113 via the SQL application resource models 122-124, adds and executes Oracle® APIs 153-156 to enable the Oracle® plug-ins 149-152 to execute data protection operations for the Oracle® resources 115-117 via the Oracle® application resource models 125-127. Continuing the example, the application host 101 adds and executes Microsoft® Exchange APIs 169-172 to enable the Microsoft® Exchange plug-ins 165-168 to execute data protection operations for the Microsoft® Exchange resources 119-121 via the Microsoft® Exchange application resource models 128-130.

In contrast, since the vendor-neutral APIs that already exist in the application host APIs 235 are already compatible with the vendor-neutral modules that execute data protection operations and each vendor's application resources via the vendor-neutral application resource models. the application host 201 executes the already existing vendor-neutral APIs to execute data protection operations for each vendor's application resources via the vendor-neutral application resource models. For example, the application host 201 executes a vendor-neutral asset discovery API 236 to discover the SQL database 212, the Oracle® database 216, and the Microsoft® Exchange database 220, and executes a vendor-neutral copy discovery API 237 to discover the SQL copy metadata 213, the Oracle® copy metadata 217, and the Microsoft® Exchange copy metadata 221. In another example, the application host 201 executes a vendor-neutral backup API 238 to back up the SQL copy metadata 213, the Oracle® copy metadata 217, and the Microsoft® Exchange copy metadata 221, and executes a vendor-neutral restore API 239 to restore the SQL database 212, the Oracle® database 216, and the Microsoft® Exchange database 220. Each of the vendor-neutral APIs 236-239 may be REST (Representational State Transfer) application programming interfaces.

Consequently, the application host 201 executes a total of only four vendor-neutral APIs 236-239 for the asset discovery, copy discovery, backup, and restore of nine vendor application resources 211-213, 215-217, and 219-221, whereas the application host 101 executes a total of twelve vendor-specific APIs 131-134, 149-152, and 165-168 for the asset discovery, copy discovery, backup, and restore of nine vendor application resources 111-113, 115-117, and 119-121. The numerical difference of eight executed APIs in this example is based on the application host 201 executing only four vendor-neutral APIs 236-239 and the application host 101 executing a total of twelve vendor-specific APIs 131-134, 149-152, and 165-168 for the four asset discovery, copy discovery, backup, and restore operations to access nine vendor application resources for three vendors' applications. However, the number of data protection operations may be expanded to six data protection operations that also include a schedule operation and an install update operation, and the number of vendors' applications is expanded to six vendors' applications that also include SAP® HANA, Microsoft® Office 365, and IBM® Db. Then the application host 201 would execute only six vendor-neutral APIs while the application host 101 would execute a total of thirty-six vendor-specific APIs (six data protection operation APIs for each of the six vendors' applications), resulting in the numerical difference of thirty executed APIs. In real-world production environments, the numerical difference of executed APIs could be significantly greater.

After installing a vendor's application, the application host 201 installs an application add-on that lists the application's attributes and data protection capabilities, which the application host 201 publishes to the application data manager 208 so that the application data manager 208 can customize vendor-neutral data protection operations based on the published capabilities. An application's attributes may include an identifier, a type (such as SQL, Oracle®, or Microsoft® Exchange), a name, a version, a last updated time stamp, data protection capabilities, and credentials supported by the operating system, database, and catalog. A capability can be the facility or potential for an indicated use or deployment. An application's data protection capabilities may include support for centralized back up, support for centralized restore, support for centralized delete, support for auto-configuration, support for governance, support for compliance, protection options, protection rules, and restore options (such as supported destination and under progress). An application's protection options may include backup levels (such as full, transaction log, differential, and incremental), force full on cube failure (true or false), and an array of custom protection attributes (such as type: Int, name: delete older archived log, description: delete archived log older than, maximum value: 30, and minimum value: 1). For example, after installing the SQL application 210, the Oracle® application 214, and the Microsoft® Exchange application 218, the application host 201 installs a SQL application add-on 240, an Oracle® application add-on 241, and a Microsoft® Exchange application add-on 242, and publishes the capabilities of the SQL application add-on 240, the Oracle® application add-on 241, and the Microsoft® Exchange application add-on 242 to the application data manager 208.

As described above, the application data manager 108 installs and executes vendor-specific modules that execute data protection operations which are based on receiving the publication of attributes of vendor-specific plug-ins, application resource models, application resources, and applications. For example, the application data manager 108 installs and executes the SQL data protection operation modules 140-143 based on the SQL plug-ins 131-134, application resource models 122-124, application resources 111-113, and application 110, and installs and executes the Oracle® data protection operation modules 157-160 based on the Oracle® plug-ins 149-152, application resource models 128-130, application resources 115-117, and application 114. Continuing the example, the application data manager 108 installs and executes the Microsoft® Exchange data protection operation modules 173-176 based on the Microsoft® Exchange plug-ins 165-168, application resource models 128-130, application resources 119-121, and application 118.

In contrast, since the vendor-neutral data protection operation modules that already exist in the application data manager 208 are already compatible with the vendor's application resources via the vendor-neutral application resource models. the application host 201 executes the already existing vendor-neutral data protection operation modules to execute data protection operations for each vendor's application resources via the vendor-neutral application resource models. For example, the application data manager 208 executes a vendor-neutral asset discovery module 243 to discover the SQL database 212, the Oracle® database 216, and the Microsoft® Exchange database 220, and executes a vendor-neutral copy discovery module 244 to discover the SQL copy metadata 213, the Oracle® copy metadata 217, and the Microsoft® Exchange copy metadata 221. In another example, the application data manager 208 executes a vendor-neutral backup module 245 to back up the SQL copy metadata 213, the Oracle® copy metadata 217, and the Microsoft® Exchange copy metadata 221, and executes a vendor-neutral restore module 246 to restore the SQL database 212, the Oracle® database 216, and the Microsoft® Exchange database 220.

Consequently, the application data manager 208 executes a total of only four vendor-neutral modules 243-246 for the asset discovery, copy discovery, backup, and restore of nine vendor application resources 211-213, 215-217, and 219-221, whereas the application data manager 108 executes a total of twelve vendor-specific modules 140-143, 157-160, and 173-176 for the asset discovery, copy discovery, backup, and restore of nine vendor application resources 111-113, 115-117, and 119-121. The numerical difference of eight executed components in this example is based on the application data manager 208 executing only four vendor-neutral modules 243-246 and the application data manager 108 executing a total of twelve vendor-specific modules 140-143, 157-160, and 173-176 for the four asset discovery, copy discovery, backup, and restore operations to access nine vendor application resources for three vendors' applications. However, the number of data protection operations may be expanded to six data protection operations that also include a schedule operation and an install update operation, and the number of vendors' applications is expanded to six vendors' applications that also include SAP® HANA, Microsoft® Office 365, and IBM® Db2. Then the application data manager 208 would execute only six vendor-neutral modules while the application data manager 108 would execute a total of thirty-six vendor-specific modules (six data protection operation modules for each of the six vendors' applications), resulting in the numerical difference of thirty executed modules. In real-world production environments, the numerical difference of executed modules could be significantly greater.

As described above, the application data manager 108 follows the installation of a vendor-specific modules by adding and executing vendor-specific APIs to the backup server-application host APIs 148 to access the vendor's application resources. For example, the application data manager 108 adds and executes the SQL APIs 144-147 to access the SQL application resources 111-113 via the SQL application resource models 122-124, adds and executes the Oracle® APIs 161-164 to access the Oracle® application resources 115-117 via the Oracle® application resource models 125-127, and adds and executes the Microsoft® Exchange APIs 177-180 to access the Microsoft® Exchange application resources 119-121 via the Microsoft® Exchange application resource models 128-130. In contrast, since the vendor-neutral data protection operation APIs that already exist in the backup server-application host APIs 247 are already compatible with the vendor-neutral data protection operation modules to execute data protection operations and the vendor's application resources via the vendor-neutral application resource models. the application host 201 executes the already existing vendor-neutral APIs to execute data protection operations for each vendor's application resources via the vendor-neutral application resource models. For example, the application data manager 208 executes a vendor-neutral asset discovery API 248 to discover the SQL database 212, the Oracle® database 216, and the Microsoft® Exchange database 220, and executes a vendor-neutral copy discovery API 249 to discover the SQL copy metadata 213, the Oracle® copy metadata 217, and the Microsoft® Exchange copy metadata 221. In another example, the application data manager 208 executes a vendor-neutral backup API 250 to back up the SQL copy metadata 213, the Oracle® copy metadata 217, and the Microsoft® Exchange copy metadata 221, and executes a vendor-neutral restore API 251 to restore the SQL database 212, the Oracle® database 216, and the Microsoft® Exchange database 220. Each of the vendor-neutral APIs 248-251 may be REST (Representational State Transfer) application programming interfaces.

Consequently, the application data manager 208 executes a total of only four vendor-neutral APIs 248-251 for the asset discovery, copy discovery, backup, and restore of nine vendor application resources 211-213, 215-217, and 219-221, whereas the application data manager 108 executes a total of twelve vendor-specific APIs 144-147, 161-164, and 177-180 for the asset discovery, copy discovery, backup, and restore of nine vendor application resources 111-113, 115-117, and 119-121. The numerical difference of eight executed APIs in this example is based on the application data manager 208 executing only four vendor-neutral APIs 248-251 and the application data manager 108 executing a total of twelve vendor-specific APIs 144-147, 161-164, and 177-180 for the four asset discovery, copy discovery, backup, and restore operations to access nine vendor application resources for three vendors' applications. However, the number of data protection operations may be expanded to six data protection operations that also include a schedule operation and an install update operation, and the number of vendors' applications is expanded to six vendors' applications that also include SAP® HANA, Microsoft® Office 365, and IBM® Db2. Then the application data manager 208 would execute only six vendor-neutral APIs while the application data manager 108 would execute a total of thirty-six vendor-specific APIs (six data protection operation APIs for each of the six vendors' applications), resulting in the numerical difference of thirty executed APIs. In real-world production environments, the numerical difference of executed APIs could be significantly greater.

In an example of the sequence of executions to implement a backup operation, the application data manager 208 executes the vendor-neutral backup module 245, which executes the vendor-neutral backup REST API 250, which executes the vendor-neutral backup module 233 in the agent of application data manager 209, which executes the vendor-neutral backup REST API 238, which backs up the SQL copy metadata 213 via the vendor-neutral metadata model for the SQL copy metadata 224. In another example of the sequence of executions to implement a backup operation, the application data manager 208 executes the vendor-neutral backup module 245, which executes the vendor-neutral backup REST API 250, which executes the vendor-neutral backup module 233 in the agent of application data manager 209, which executes the vendor-neutral backup REST API 238, which backs up the Oracle® copy metadata 217 via the vendor-neutral metadata model for Oracle® copy metadata 227. In yet another example of the sequence of executions to implement a backup operation, the application data manager 208 executes the vendor-neutral backup module 245, which executes the vendor-neutral backup REST API 250, which executes the vendor-neutral backup module 233 in the agent of application data manager 209, which executes the vendor-neutral backup REST API 238, which backs up the Microsoft® Exchange copy metadata 221 via the vendor-neutral metadata model for Microsoft® Exchange copy metadata 230.

FIG. 2 depicts the system 200 with one application data manager 208 that executes four modules 243-246, which execute four APIs 248-251, which execute four modules 231-234 in one agent of application data manager 209, which executes four APIs 236-239 to access nine application resources 211-213, 215-217, and 219-221 via nine application resources models 222-230. However, the system 200 may include any number of application data managers 208 that execute any number of modules 243-246, which execute any number of APIs 248-251, which execute any number of modules 231-234 in any number of agents of application data manager 209, which execute any number of APIs 236-239 to access any number of application resources 211-213, 215-217, and 219-221 via any number of application resource models 222-230.

Figure 3:
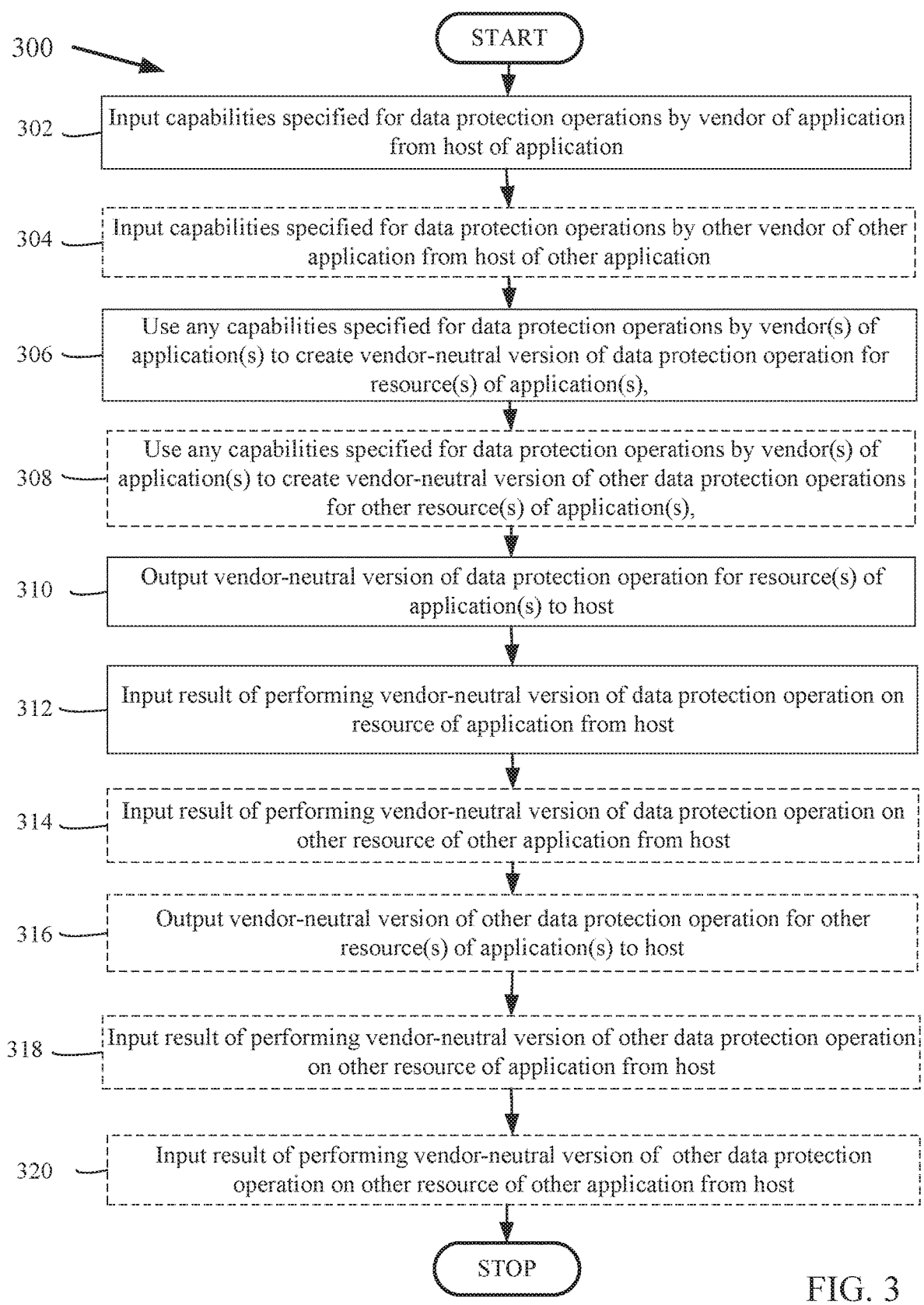
FIG. 3 is a flowchart that illustrates a method of creating vendor-neutral data protection operations for vendors' application resources, under an embodiment.

FIG. 3 is a flowchart that illustrates a method for creating vendor-neutral data protection operations for vendors' application resources, under an embodiment. Flowchart 300 illustrates method acts illustrated as flowchart blocks for certain steps involved in the backup server 202 and/or between the backup server 202 and the application host 201 of FIG. 2.

Capabilities specified for data protection operations by a vendor of an application are input from a host of the application, block 302. A backup server receives a vendor application's data protection capabilities to create vendor-neutral data protection operations. For example, and without limitation, this can include the application data manager 208 receiving capabilities of the SQL application 210, including a centralized backup capability, from the agent of the application data manager 209, after the application host 201 installs the SQL application 210.

Additional to the capabilities already received, capabilities specified for data protection operations by another vendor of another application are optionally input from a host of the other application, block 304. A backup server can receive another vendor application's data protection capabilities to create vendor-neutral data protection operations. By way of example and without limitation, this can include the application data manager 208 receiving capabilities of the Oracle® application 214, including a centralized backup capability, from the agent of the application data manager 209, after the application host 201 installs the Oracle® application 214.

After inputting capabilities, any capabilities specified for data protection operations by any vendor(s) of any application(s) are used to create a vendor-neutral version of a data protection operation for any resource(s) of any application(s), block 306. A backup server creates a vendor-neutral data protection operation based on vendor application capabilities. In embodiments, this can include the application data manager 208 using the centralized backup capability for the SQL application 210 and the Oracle® application 214 to create a vendor-neutral asset discovery operation for the SQL database 212 and the Oracle® database 216 and a vendor-neutral copy discovery operation for the SQL copy metadata 213 and the Oracle® copy metadata 217.

Following the inputting of capabilities, any capabilities specified for data protection operations by any vendor(s) of any application(s) are optionally used to create a vendor-neutral version of another data protection operation for any resource(s) of any application(s), block 308. The backup server can create another vendor-neutral data protection operation based on vendor application capabilities. For example, and without limitation, this can include the application data manager 208 using the centralized backup capability for the SQL application 210 and the Oracle® application 214 to create a vendor-neutral backup operation for the SQL database 212, the Oracle® database 216, the SQL copy metadata 213, and the Oracle® copy metadata 217.

Having created a vendor-neutral version of a data protection operation for any resource(s) of any application(s), the vendor-neutral version of the data protection operation is output to a host, block 310. A backup server outputs a vendor-neutral data protection operation for a vendor application resource. By way of example and without limitation, this can include the application data manager 208 executing the vendor-neutral asset discovery module 243, which executes the vendor-neutral asset discovery REST API 248 to output a vendor-neutral asset discovery operation for the SQL database 212 and the Oracle® database 216 to the agent of application data manager 209. In another example, the application data manager 208 executes the vendor-neutral copy discovery module 244, which executes the vendor-neutral copy discovery REST API 249 to output a vendor-neutral copy discovery operation for the SQL copy metadata 213 and the Oracle® copy metadata 217 to the application data manager 209. Outputting a vendor-neutral version of a data protection operation for a resource of an application may be in response to receiving a vendor-neutral request from an application data manager to output the vendor-neutral version of the data protection operation to a host. For example, the vendor-neutral asset discovery REST API 248 outputs the vendor-neutral asset discovery operation for the SQL database 212 and the Oracle® database 216 to the agent of application data manager 209 in response to receiving a vendor-neutral request from the application data manager 208 to output the vendor-neutral asset discovery operation for the SQL database 212 and the Oracle® database 216 to the application host 201. A vendor-neutral request can be a solicitation that is compatible with multiple products.

After outputting a vendor-neutral version of a data protection operation, a result of performing the vendor-neutral version of the data protection operation on a resource of an application is input from a host, block 312. A backup server receives a vendor-neutral data protection operation result. In embodiments, this can include the application data manager 208 receiving the discovery of the SQL copy metadata 213 via the vendor-neutral copy discovery REST API 249. A result can be a consequence, an effect, or a conclusion of an action.

Additional to inputting a result of performing a vendor-neutral version of a data protection operation on a resource of an application, a result of performing the vendor-neutral version of the data protection operation on another resource of another application is optionally input from a host, block 314. A backup server can receive another vendor-neutral data protection operation result. For example, and without limitation, this can include the application data manager 208 receiving the discovery of the Oracle® copy metadata 217 via the vendor-neutral copy discovery REST API 249.

In addition to creating a vendor-neutral version of another data protection operation for any resource(s) of any application(s), the vendor-neutral version of the data protection operation is optionally output to a host, block 316. A backup server can output another vendor-neutral data protection operation for a vendor application resource. By way of example and without limitation, this can include the application data manager 208 executing the vendor-neutral backup module 245, which executes the vendor-neutral backup REST API 250 to output a vendor-neutral backup operation for the SQL database 212, the Oracle® database 216, the SQL copy metadata 213, and the Oracle® copy metadata 217 to the agent of application data manager 209.

Following the outputting of a vendor-neutral version of another data protection operation, a result of performing the vendor-neutral version of the other data protection operation on another resource of an application is optionally input from a host, block 318. A backup server can receive yet another vendor-neutral data protection operation result. In embodiments, this can include the application data manager 208 receiving the backup copy of the SQL copy metadata 213 via the vendor-neutral backup REST API 250.

Having output a vendor-neutral version of another data protection operation, a result of performing the vendor-neutral version of the other data protection operation on another resource of another application is optionally input from a host, block 320. A backup server can receive an additional vendor-neutral data protection operation result. For example, and without limitation, this can include the application data manager 208 receiving the backup copy of the Oracle® copy metadata 217 via the vendor-neutral backup REST API 250.

Although FIG. 3 depicts the blocks 302-320 occurring in a specific order, the blocks 302-320 may occur in another order. In other implementations, each of the blocks 302-320 may also be executed in combination with other blocks and/or some blocks may be divided into a different set of blocks.

Figure 4:
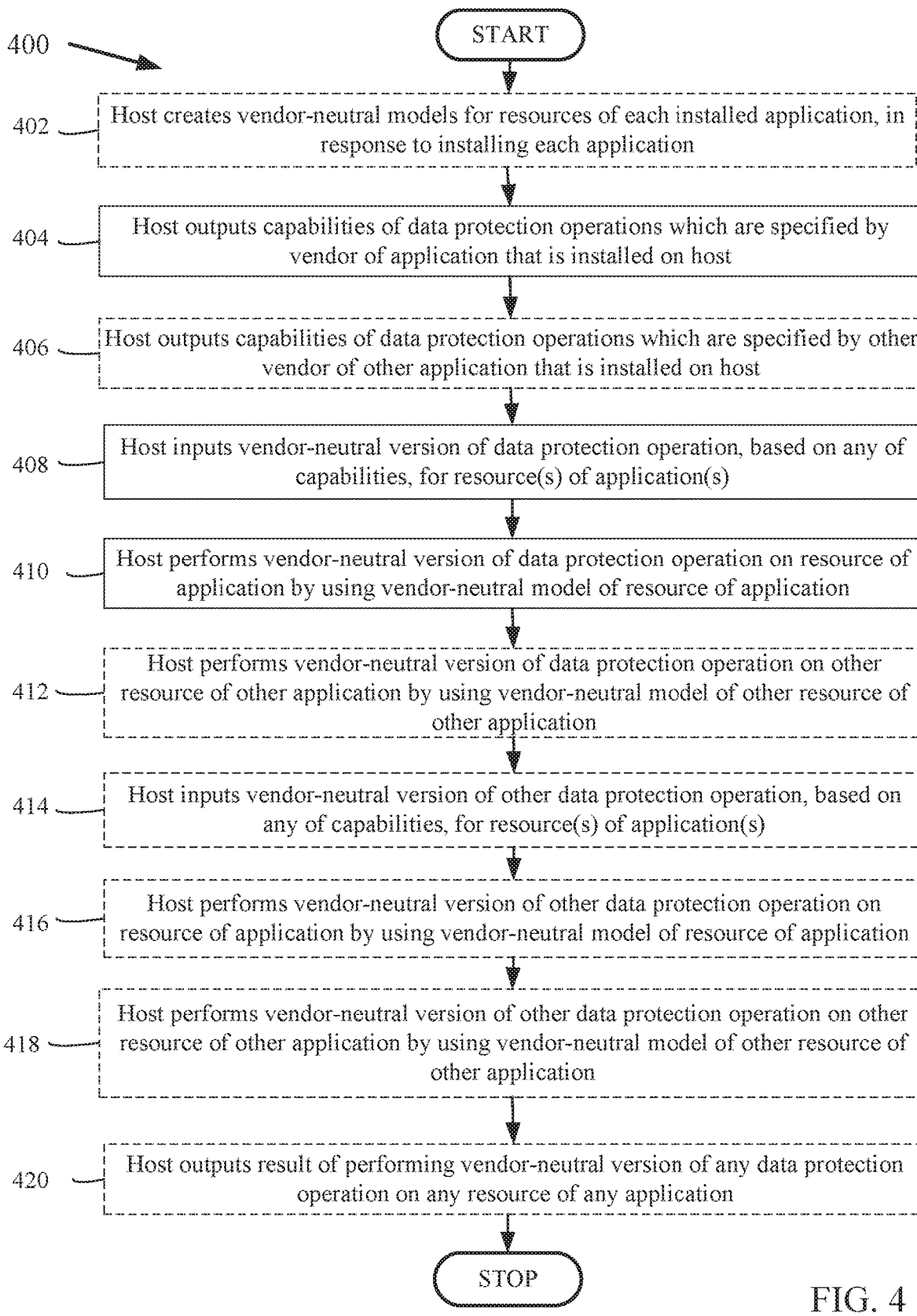
FIG. 4 is a flowchart that illustrates a method of vendor-neutral models of vendors' application resources, under an embodiment.

FIG. 4 is a flowchart that illustrates a method for vendor-neutral models of vendors' application resources, under an embodiment. Flowchart 400 illustrates method acts illustrated as flowchart blocks for certain steps involved in the application host 201 and/or between the application host 201 and the backup server 202 of FIG. 2.

Vendor-neutral models are optionally created by a host for resources of each installed application, in response to installing each application, block 402. An application host can create vendor-neutral application resource models that enable access to each vendor's application resources. For example, and without limitation, this can include the agent of application data manager 209 creating the vendor-neutral application resource models 222-230 after installing the SQL, Oracle®, and Microsoft® Exchange applications 210, 214, and 218.

Capabilities of data protection operations which are specified by a vendor of an application which is installed on a host are output by the host, block 404. An application host outputs a vendor application's data protection capabilities to enable the creation of data protection operations for the vendor application. By way of example and without limitation, this can include the agent of the application data manager 209 outputting capabilities of the SQL application 210, including a centralized backup capability, to the application data manager 208, after the application host 201 installs the SQL application 210.

Additional to outputting a vendor application's capabilities, capabilities of data protection operations which are specified by another vendor of another application which is installed on a host are optionally output by the host, block 406. An application host can output another vendor application's data protection capabilities to enable the creation of data protection operations for the other vendor application. In embodiments, this can include the agent of the application data manager 209 outputting capabilities of the Oracle® application 214, including a centralized backup capability, to the application data manager 208, after the application host 201 installs the Oracle® application 214.

After outputting data protection capabilities, a vendor-neutral version of a data protection operation, based on any of the capabilities, is input by a host for any resource(s) of any application(s), block 408. An application host receives a vendor-neutral data protection operation to perform on a vendor's application resource. For example, and without limitation, this can include the agent of application data manager 209 receiving a vendor-neutral asset discovery operation for the SQL database 212 and the Oracle® database 216, based on the centralized backup capability of the SQL application 214 and the Oracle® application 214, from the vendor-neutral asset discovery module 243 via the vendor-neutral asset discovery REST API 248. In another example, the agent of application data manager 209 receives a vendor-neutral copy discovery operation for the SQL copy metadata 213 and the Oracle® copy metadata 217, based on the centralized backup capability of the SQL application 214 and the Oracle® application 214, from the vendor-neutral copy discovery module 244 via the vendor-neutral copy discovery REST API 249. Inputting any vendor-neutral version of any one of the data protection operations for any resource of any application may be in response to receiving a vendor-neutral request from an application data manager to output any vendor-neutral version of any one of the data protection operations for any resource of any application. For example, the agent of application data manager 209 receives a vendor-neutral asset discovery operation for the SQL database 212 and the Oracle® database 216 in response to the vendor-neutral asset discovery REST API 248 receiving a vendor-neutral request from the application data manager 209 to output the vendor-neutral asset discovery operation for the SQL database 212 and the Oracle® database 216.

Following the input of a vendor-neutral version of a data protection operation, a vendor-neutral model of a resource of an application is used by a host to perform the vendor-neutral version of the data protection operation on the application resource, block 410. An application host uses a vendor-neutral model of a vendor application resource to perform a vendor-neutral data protection operation on the vendor application resource. By way of example and without limitation, this can include the agent of application data manager 209 executing the vendor-neutral asset discovery module 231, which executes the vendor-neutral asset discovery REST API 236, which uses the vendor-neutral database model of SQL database 223 to perform a vendor-neutral asset discovery operation for the SQL database 212. In another example, the agent of application data manager 209 executes the vendor-neutral copy discovery module 232, which executes the vendor-neutral copy discovery REST API 237, which uses the vendor-neutral metadata model of SQL copy metadata 224 to perform a vendor-neutral copy discovery operation for the SQL copy metadata 213.

Using any vendor-neutral model of any resource of any application to perform any vendor-neutral version of any one of the data protection operations on any resource of any application may be in response to receiving a vendor-neutral request from an agent of an application data manager to perform any vendor-neutral version of any one of the data protection operations on any resource of any application. For example, the agent of application data manager 209 uses the vendor-neutral database model of SQL database 223 to perform a vendor-neutral asset discovery operation for the SQL database 212 in response to the vendor-neutral asset discovery REST API 236 receiving a vendor-neutral request from the vendor-neutral asset discovery module 231 to use the vendor-neutral database model of SQL database 223 to perform the vendor-neutral asset discovery operation for the SQL database 212. After performing a vendor-neutral version of any data protection operations on any resource of any application, a host can output a result of performing the vendor-neutral version of the data protection operations on the application resource. For example, the agent of application data manager 209 executes the vendor-neutral copy discovery REST API 249 to report the discovery of the SQL copy metadata 213 to the vendor-neutral copy discovery module 244.

Having input a vendor-neutral version of a data protection operation, a vendor-neutral model of another resource of another application is optionally used by a host to perform the vendor-neutral version of the data protection operation on the other application resource, block 412. An application host can use a vendor-neutral model of another vendor application resource to perform a vendor-neutral data protection operation on the other vendor application resource.

In embodiments, this can include the agent of application data manager 209 executing the vendor-neutral asset discovery module 231, which executes the vendor-neutral asset discovery REST API 236, which uses the vendor-neutral database model of Oracle® database 226 to perform a vendor-neutral asset discovery operation for the Oracle® database 216. In another example, the agent of application data manager 209 executes the vendor-neutral copy discovery module 232, which executes the vendor-neutral copy discovery REST API 237, which uses the vendor-neutral metadata model of Oracle® copy metadata 227 to perform a vendor-neutral copy discovery operation for the Oracle® copy metadata 217. After performing a vendor-neutral version of any data protection operations on any resource of any application, a host can output a result of performing the vendor-neutral version of the data protection operations on the application resource. For example, the agent of application data manager 209 executes the vendor-neutral copy discovery REST API 249 to report the discovery of the Oracle® copy metadata 217 to the vendor-neutral copy discovery module 244.

Additional to inputting a vendor-neutral version of a data protection operation, a vendor-neutral version of another data protection operation, based on any of the capabilities, is optionally input by a host for any resource(s) of any application(s), block 414. An application host can receive another vendor-neutral data protection operation to perform on a vendor application resource. For example, and without limitation, this can include the agent of application data manager 209 receiving a vendor-neutral backup operation for the SQL copy metadata 213 and the Oracle® copy metadata 217, based on the centralized backup capability of the SQL application 214 and the Oracle® application 214, from the vendor-neutral backup module 245 via the vendor-neutral backup REST API 250.

Following the input of a vendor-neutral version of another data protection operation, a vendor-neutral model of a resource of an application is optionally used by a host to perform the vendor-neutral version of the other data protection operation on the application resource, block 416. An application host can use a vendor-neutral model of a vendor application resource to perform another vendor-neutral data protection operation on the vendor application resource. By way of example and without limitation, this can include the agent of application data manager 209 executing the vendor-neutral backup module 233, which executes the vendor-neutral backup REST API 238, which uses the vendor-neutral metadata model of SQL copy metadata 224 to perform a vendor-neutral backup operation on the SQL copy metadata 213. After performing a vendor-neutral version of any data protection operations on any resource of any application, a host can output a result of performing the vendor-neutral version of the data protection operations on the application resource. For example, the agent of application data manager 209 executes the vendor-neutral backup REST API 250 to output the backup copy of the SQL copy metadata 213 to the vendor-neutral backup module 245.

Having input a vendor-neutral version of another data protection operation, a vendor-neutral model of another resource of another application is optionally used by a host to perform the vendor-neutral version of the other data protection operation on the other application resource, block 418. An application host can use a vendor-neutral model of another vendor application resource to perform another vendor-neutral data protection operation on the other vendor application resource. In embodiments, this can include the agent of application data manager 209 executing the vendor-neutral backup module 233, which executes the vendor-neutral backup REST API 238, which uses the vendor-neutral metadata model of Oracle® copy metadata 227 to perform a vendor-neutral backup operation on the Oracle® copy metadata 217

After performing a vendor-neutral version of any data protection operation on any resource of any application, a result of performing the vendor-neutral version of the data protection operation on the application resource is optionally output by a host, block 420. An application host can report on the performance of vendor-neutral data protection operations that use vendor-neutral application resource models. For example, and without limitation, this can include the agent of application data manager 209 executing the vendor-neutral backup REST API 250 to output the backup copy of the Oracle® copy metadata 217 to the vendor-neutral backup module 245.

Although FIG. 4 depicts the blocks 402-420 occurring in a specific order, the blocks 402-420 may occur in another order. In other implementations, each of the blocks 402-420 may also be executed in combination with other blocks and/or some blocks may be divided into a different set of blocks.

Figure 5:
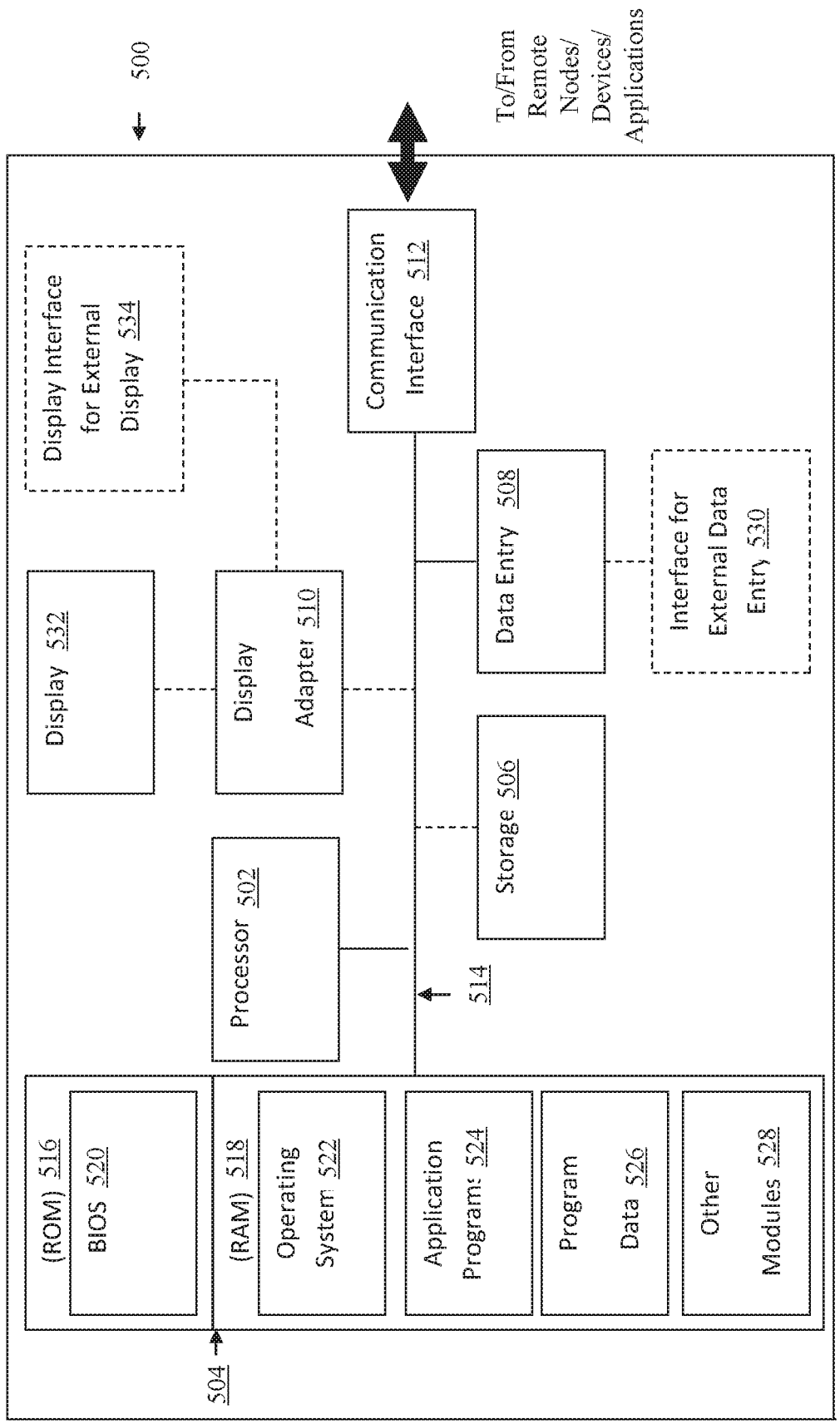
FIG. 5 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 5 may vary depending on the system implementation. With reference to FIG. 5, an exemplary system for implementing the subject matter disclosed herein includes a hardware device 500, including a processing unit 502, memory 504, storage 506, a data entry module 508, a display adapter 510, a communication interface 512, and a bus 514 that couples the elements 504-512 to the processing unit 502.

The bus 514 may comprise any type of bus architecture. Examples include a memory bus, a peripheral bus, a local bus, etc. The processing unit 502 is an instruction execution machine, apparatus, or device and may comprise a microprocessor, a digital signal processor, a graphics processing unit, an application specific integrated circuit (ASIC), a field programmable gate array (FPGA), etc. The processing unit 502 may be configured to execute program instructions stored in the memory 504 and/or the storage 506 and/or received via the data entry module 508.

The memory 504 may include read only memory (ROM) 516 and random access memory (RAM) 518. The memory 504 may be configured to store program instructions and data during operation of the hardware device 500. In various embodiments, the memory 504 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 504 may also include nonvolatile memory technologies such as nonvolatile flash RAM (NVRAM) or ROM. In some embodiments, it is contemplated that the memory 504 may include a combination of technologies such as the foregoing, as well as other technologies not specifically mentioned. When the subject matter is implemented in a computer system, a basic input/output system (BIOS) 520, containing the basic routines that help to transfer information between elements within the computer system, such as during start-up, is stored in the ROM 516.

The storage 506 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 500.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 506, the ROM 516 or the RAM 518, including an operating system 522, one or more applications programs 524, program data 526, and other program modules 528. A user may enter commands and information into the hardware device 500 through the data entry module 508. The data entry module 508 may include mechanisms such as a keyboard, a touch screen, a pointing device, etc. Other external input devices (not shown) are connected to the hardware device 500 via an external data entry interface 530. By way of example and not limitation, external input devices may include a microphone, joystick, game pad, satellite dish, scanner, or the like. In some embodiments, external input devices may include video or audio input devices such as a video camera, a still camera, etc. The data entry module 508 may be configured to receive input from one or more users of the hardware device 500 and to deliver such input to the processing unit 502 and/or the memory 504 via the bus 514.

A display 532 is also connected to the bus 514 via the display adapter 510. The display 532 may be configured to display output of the hardware device 500 to one or more users. In some embodiments, a given device such as a touch screen, for example, may function as both the data entry module 508 and the display 532. External display devices may also be connected to the bus 514 via an external display interface 534. Other peripheral output devices, not shown, such as speakers and printers, may be connected to the hardware device 500.

The hardware device 500 may operate in a networked environment using logical connections to one or more remote nodes (not shown) via the communication interface 512. The remote node may be another computer, a server, a router, a peer device or other common network node, and typically includes many or all of the elements described above relative to the hardware device 500. The communication interface 512 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 512 may include logic configured to support direct memory access (DMA) transfers between the memory 504 and other devices.

In a networked environment, program modules depicted relative to the hardware device 500, or portions thereof, may be stored in a remote storage device, such as, for example, on a server. It will be appreciated that other hardware and/or software to establish a communications link between the hardware device 500 and other devices may be used.

It should be understood that the arrangement of the hardware device 500 illustrated in FIG. 5 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 500.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 5.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for creating vendor-neutral data protection operations for vendors' application resources, comprising:
   one or more processors; and
   a non-transitory computer readable medium storing a plurality of instructions, which when executed, cause the one or more processors to:
   create, based on any capabilities specified for data protection operations by a vendor of an application, a vendor-neutral version of one of the data protection operations for a resource of the application, in response to inputting, from a host of the application, capabilities specified for the data protection operations by the vendor;
   output, to the host, the vendor-neutral version of the one of the data protection operations for the resource of the application; and
   input, from the host, a result of performing the vendor-neutral version of the one of the data protection operations on the resource of the application.

2. The system of claim 1, wherein any data protection operation comprises one of a discover database operation, a discover copy metadata operation, a backup operation, a restore operation, a schedule operation, and an install update operation.

3. The system of claim 1, wherein any resource comprises one of an application server, a database, copy metadata, any application, and a file system.

4. The system of claim 1, wherein outputting the vendor-neutral version of the one of the data protection operations for the resource of the application is in response to receiving a vendor-neutral request from an application data manager to output the vendor-neutral version of the one of the data protection operations to the host.

5. The system of claim 1, wherein the vendor-neutral version of the one of the data protection operations is also based on any capabilities specified for the data protection operations by another vendor of another application on the host, and is also for another resource of the other application, and the plurality of instructions further causes the processor to:
   input, from the host, capabilities specified for the data protection operations by the other vendor of the other application; and
   input, from the host, a result of performing the vendor-neutral version of the one of the data protection operations on the other resource of the other application.

6. The system of claim 1, wherein the plurality of instructions further causes the processor to:
   create, based on any capabilities specified for data protection operations by the vendor of the application, a vendor-neutral version of another one of the data protection operations for another resource of the application;
   output, to the host, the vendor-neutral version of the other one of the data protection operations for the other resource of the application; and
   input, from the host, a result of performing the vendor-neutral version of the other one of the data protection operations on the other resource of the application.

7. The system of claim 6, wherein the other one of the data protection operations is also for another resource of another application on the host, and the plurality of instructions further causes the processor to:
   input, from the host, capabilities specified for the data protection operations by another vendor of another application; and
   input, from the host, a result of performing the vendor-neutral version of the other one of the data protection operations on the other resource of the other application.

8. A computer-implemented method for creating vendor-neutral data protection operations for vendors' application resources, the computer-implemented method comprising:
   creating, based on any capabilities specified for data protection operations by a vendor of an application, a vendor-neutral version of one of the data protection operations for a resource of the application, in response to inputting, from a host of the application, capabilities specified for the data protection operations by the vendor;
   outputting, to the host, the vendor-neutral version of the one of the data protection operations for the resource of the application; and
   inputting, from the host, a result of performing the vendor-neutral version of the one of the data protection operations on the resource of the application.

9. The computer-implemented method of claim 8, wherein any data protection operation comprises one of a discover database operation, a discover copy metadata operation, a backup operation, a restore operation, a schedule operation, and an install update operation.

10. The computer-implemented method of claim 8, wherein any resource comprises one of an application server, a database, copy metadata, any application, and a file system.

11. The computer-implemented method of claim 8, wherein outputting the vendor-neutral version of the one of the data protection operations for the resource of the application is in response to receiving a vendor-neutral request from an application data manager to output the vendor-neutral version of the one of the data protection operations to the host.

12. The computer-implemented method of claim 8, wherein the vendor-neutral version of the one of the data protection operations is also based on any capabilities specified for the data protection operations by another vendor of another application on the host, and is also for another resource of the other application, and the computer-implemented method further comprises:

inputting, from the host, capabilities specified for the data protection operations by the other vendor of the other application; and inputting, from the host, a result of performing the vendor-neutral version of the one of the data protection operations on the other resource of the other application.

13. The computer-implemented method of claim 8, wherein the computer-implemented method further comprises:

creating, based on any capabilities specified for data protection operations by the vendor of the application, a vendor-neutral version of another one of the data protection operations for another resource of the application;

outputting, to the host, the vendor-neutral version of the other one of the data protection operations for the other resource of the application; and inputting, from the host, a result of performing the vendor-neutral version of the other one of the data protection operations on the other resource of the application.

14. The computer-implemented method of claim 13, wherein the other one of the data protection operations is also for another resource of another application on the host, and the computer-implemented method further comprises:

inputting, from the host, capabilities specified for the data protection operations by another vendor of another application; and inputting, from the host, a result of performing the vendor-neutral version of the other one of the data protection operations on the other resource of the other application.

15. A computer program product, comprising a non-transitory computer-readable medium having a computer-readable program code embodied therein to be executed by one or more processors, the program code including instructions to:

create, based on any capabilities specified for data protection operations by a vendor of an application, a vendor-neutral version of one of the data protection operations for a resource of the application, in response to inputting, from a host of the application, capabilities specified for the data protection operations by the vendor;

output, to the host, the vendor-neutral version of the one of the data protection operations for the resource of the application; and input, from the host, a result of performing the vendor-neutral version of the one of the data protection operations on the resource of the application.

16. The computer program product of claim 15, wherein any data protection operation comprises one of a discover database operation, a discover copy metadata operation, a backup operation, a restore operation, a schedule operation, and an install update operation, and any resource comprises one of an application server, a database, copy metadata, any application, and a file system.

17. The computer program product of claim 15, wherein outputting the vendor-neutral version of the one of the data protection operations for the resource of the application is in response to receiving a vendor-neutral request from an application data manager to output the vendor-neutral version of the one of the data protection operations to the host.

18. The computer program product of claim 15, wherein the vendor-neutral version of the one of the data protection operations is also based on any capabilities specified for the data protection operations by another vendor of another application on the host, and is also for another resource of the other application, and the program code includes further instructions to:

input, from the host, capabilities specified for the data protection operations by the other vendor of the other application; and input, from the host, a result of performing the vendor-neutral version of the one of the data protection operations on the other resource of the other application.

19. The computer program product of claim 15, wherein the program code includes further instructions to:

create, based on any capabilities specified for data protection operations by the vendor of the application, a vendor-neutral version of another one of the data protection operations for another resource of the application;

output, to the host, the vendor-neutral version of the other one of the data protection operations for the other resource of the application; and input, from the host, a result of performing the vendor-neutral version of the other one of the data protection operations on the other resource of the application.

20. The computer program product of claim 19, wherein the other one of the data protection operations is also for another resource of another application on the host, and the program code includes further instructions to:

input, from the host, capabilities specified for the data protection operations by another vendor of another application; and input, from the host, a result of performing the vendor-neutral version of the other one of the data protection operations on the other resource of the other application.

\* \* \* \* \*